United States Patent [19]
Letchford et al.

[11] Patent Number: 5,900,464
[45] Date of Patent: May 4, 1999

[54] PROCESSES FOR MAKING METHACRYLATE AND ACRYLATE POLYMERS

[75] Inventors: Robert J. Letchford, Cherryville; James A. Schwindeman, Lincolnton; Conrad W. Kamienski, Gastonia, all of N.C.; Roderic P. Quirk, Akron, Ohio

[73] Assignee: FMC Corporation, Philadelphia, Pa.

[21] Appl. No.: 08/677,793

[22] Filed: Jul. 10, 1996

Related U.S. Application Data

[60] Provisional application No. 60/006,062, Jul. 25, 1995.

[51] Int. Cl.$^6$ .......................... C08L 31/02; C08F 297/02
[52] U.S. Cl. ................................ 525/94; 525/88; 525/93; 525/123; 525/178; 525/183; 525/272; 525/305; 525/329.1; 525/329.2; 525/329.4; 525/329.7; 525/330.3; 525/338; 525/359.6; 525/379; 525/382; 525/384; 525/385; 525/386; 526/176; 526/178; 526/180; 526/181
[58] Field of Search ...................................... 526/178, 180, 526/181, 312, 329.7; 525/88, 93, 94, 123, 178, 183, 272, 305, 329.1, 329.2, 329.4, 329.7, 330.3, 338, 359.6, 379, 382, 384, 385, 386

[56] References Cited

U.S. PATENT DOCUMENTS

| | | |
|---|---|---|
| 3,326,881 | 6/1967 | Uraneck et al. . |
| 3,776,964 | 12/1973 | Morrison et al. . |
| 3,842,146 | 10/1974 | Milkovich et al. . |
| 3,862,100 | 1/1975 | Halasa et al. . |
| 3,954,894 | 5/1976 | Kamienski et al. . |
| 4,039,593 | 8/1977 | Kamienski et al. . |
| 4,351,924 | 9/1982 | Andrews et al. ................. 526/181 X |
| 4,417,034 | 11/1983 | Webster . |
| 5,266,667 | 11/1993 | Teyssie et al. . |
| 5,331,058 | 7/1994 | Shepherd et al. . |
| 5,362,699 | 11/1994 | Shepherd et al. . |
| 5,376,745 | 12/1994 | Handlin, Jr. et al. . |
| 5,391,663 | 2/1995 | Bening et al. . |
| 5,416,168 | 5/1995 | Willis et al. . |
| 5,486,568 | 1/1996 | Bening et al. . |
| 5,527,753 | 6/1996 | Engel et al. . |

FOREIGN PATENT DOCUMENTS

| | | |
|---|---|---|
| 0 551 221 | 7/1993 | European Pat. Off. . |
| 0 801 2710 | 6/1994 | Japan . |
| 8-27202 | 1/1996 | Japan . |
| 2 241 239 | 8/1991 | United Kingdom . |
| 2 270 317 | 3/1994 | United Kingdom . |
| WO 95/22566 | of 0000 | WIPO . |
| WO 91/12277 | 8/1991 | WIPO . |

OTHER PUBLICATIONS

R. Jerome et al., "The Anionic Polymerization of Alkyl Acrylates: A Challenge," *Recent Advances in Mechanistic and Synthetic Aspects of Polymerization* (M. Fontanille and A. Guyot, eds. 1987), pp. 101–117.
P. Bayard et al., *Polymer Bulletin* 32, 381–385 (1994).
J.S. Wang et al., *Macromolecules* 27, 4890–4895 (1994).
L. Dvoranek et al., *Macromolecules* 27, 4881–4885 (1994).
J.S. Wang et al., *Macromolecules* 27, 4902–4907, 4635–4638 (1994).
J.S. Wang et al., *Macromolecules* 27, 169–1696 (1994).
T.P. Davis et al., *J.M.S.–Rev. Macromol. Chem. Phys.* C34(2), 243–324 (1994).
D. Sogah et al., *Macromolecules* 20, 1473 (1987).
D. Sogah et al., *J. Polym. Sci., Polym. Lett. Ed.* 21, 927 (1983).
G. Cohen, *Polym. Prepr., Am. Chem. Soc., Div. Polym. Chem.* 29(2), 46 (1988).
O.W. Webster et al., *J. Macromol. Sci.–Chem.* A21 (8&9), 943–960 (1984).
R. Quirk et al., "Alkyllithium–Initiated Polymerization of Myrcene New Block Copolymers of Styrene and Myrcene," *New Monomers and Polymers* (B.M. Culbertson and C.U. Pittman, Jr., Plenum, New York 1984), pp. 329–355.
H. Hsieh and R. Quirk, *Anionic Polymerization* (Marcel Dekker, Inc., New York 1996), pp. 641–684.
G.D. Andrews et al., "New Functional Methacrylate Polymers by Anionic Polymerization," *New Monomers and Polymers* (B.M. Culbertson and C.U. Pittman, Jr., Plenum, New York 1984), pp. 357–380.

Primary Examiner—Fred Teskin
Attorney, Agent, or Firm—Bell Seltzer Intellectual Property Law Group of Alston & Bird LLP

[57] ABSTRACT

Polar polymers having the following formula:

$$FG-(Q)_d-R_n-Z-J-[A(R^1R^2R^3)]_x \qquad (I)$$

wherein FG is H or a protected or non-protected functional group; Q is a polar hydrocarbyl group derived by incorporation of a polar compound selected from group consisting of esters, amides, and nitriles of acrylic and methacrylic acid, and mixtures thereof; d is an integer from 10 to 2000; R is a saturated or unsaturated hydrocarbyl group derived by incorporation of a compound selected from the group consisting of conjugated diene hydrocarbons, alkenylsubstituted aromatic hydrocarbons, and mixtures thereof; n is an integer from 0 to 5; Z is a branched or straight chain hydrocarbon group which contains 3–25 carbon atoms, optionally containing aryl or substituted aryl groups; J is oxygen, sulfur, or nitrogen; $[A(R^1R^2R^3)]_x$ is a protecting group, in which A is an element selected from Group IVa of the Periodic Table of Elements; $R^1$, $R^2$, and $R^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen, and living anionic polymerization processes for preparing the same.

19 Claims, No Drawings

PROCESSES FOR MAKING METHACRYLATE AND ACRYLATE POLYMERS

CROSS-REFERENCE TO RELATED APPLICATIONS

This application is related to commonly owned copending Provisional Application Ser. No. 60/006,062, filed Jul. 25, 1995, and claims the benefit of its earlier filing date under 35 U.S.C. 119(e).

FIELD OF THE INVENTION

This invention relates to novel functionalized polar polymers and processes for producing the same. More particularly, the invention relates novel functionalized methacrylate and acrylate polymers and processes for the anionic polymerization of the same.

BACKGROUND OF THE INVENTION

Living polymerizations can provide advantages over other polymerization techniques, such as well-defined polymer structures and low degree of compositional heterogeneity. Many of the variables that affect polymer properties can be controlled, including molecular weight, molecular weight distribution, copolymer composition and microstructure, stereochemistry, branching and chain end functionality.

Living anionic polymerization of styrene and diene monomers were first described by Szwarc and his coworkers. See M. Szwarc, *Nature* 178, 1169 (1956) and M. Szwarc, et al., *J.Am.Chem.Soc.* 78, 2656 (1956). While living anionic polymerization can be effective for the controlled polymerization of non-polar monomers, anionic polymerization of polar monomers, such as methacrylates and acrylates, is more problematic. The presence of a carbonyl group in acrylate monomers complicates anionic polymerization of polar monomers. For example, nucleophilic attack at the carbonyl group can lead to no initiation or polymerization termination.

Various techniques have been proposed to address the problem of anionic polymerization of methacrylate and acrylate monomers. Proposals include low polymerization temperatures (−78° C.), the use of sterically hindered initiators, bulky alkyl ester groups, and the addition of complexing agents, such as crown ethers, lithium chloride and lithium alkoxides. Other techniques include metal-free anionic polymerization using delocalized carbanion initiators with nonmetallic tetrabutylammonium salts (see, e.g., M. T. Reetz, *Angew.Chem.Int.Ed.Eng.* 27, 994 (1988)); group transfer polymerization, using a silicon-based initiator (O. W. Webster, et al., European Patent 0 068 887 (1986)); and immortal polymerization using aluminum porphyrins as initiators (M. Kuroki et al., *J.Am.Chem.Soc.* 109, 4739 (1987); Y. Hosokawa, et al., *Macromolecules* 24, 824 (1991)). See also, T. P. Davis, et al., *Rev.Macromol.Chem.Phys.*, C34(2), 243–324 (1994) and H. Hsieh and R. Quirk, *Anionic Polymerization* (Marcel Dekker, Inc., New York 1996) for a more complete review.

Although useful, these and other techniques of anionic polymerization of methacrylate and acrylate monomers can suffer from drawbacks, such as ineffectiveness at higher temperatures, slow reaction rates, broad molecular weight distributions, poor copolymerization with polar and non-polar comonomers, and the like. Further, these processes can be expensive, thus limiting their commercial applicability.

These problems can be compounded when polymerizing acrylate monomers, which are more reactive than methacrylate monomers.

SUMMARY OF THE INVENTION

The present invention provides novel polar polymers, including functionalized, telechelic, heterotelechelic, and multi-branched or star methacrylate and acrylate polymers, and processes for preparing the same. The novel polymers have applications in a variety of areas, including use in low VOC coatings, adhesives, and as viscosity index (V.I.) improvers for lubricants.

The present invention also provides processes for anionic polymerization of polar monomers to produce the polymers of the invention. These polymers are prepared from protected functionalized initiators which are reacted with an appropriate diaryl alkenyl group, such as 1,1-diphenylethylene, to provide a stabilized carbanion. A polar monomer, preferably methyl methacrylate, is polymerized in the presence of the initiator to provide a living anion.

The resultant living anion can be quenched, for example with acidic methanol, to afford a protected, mono-functional polar polymer, and removal of the protecting group results in a functionalized polar polymer.

Alternatively, the resultant living anion can be quenched with various functionalizing agents, such as ethylene oxide, carbon dioxide, epichlorohydrin, and the like, to afford a mono-protected telechelic polar polymer. The functional groups on the termini of the polymer can be the same (such as two hydroxyl groups) or different (such as one hydroxyl group and one amino group).

Protected, functionalized polar star polymers can also prepared by linking the living anion with suitable linking agents, such as ethylene glycol dimethylacrylate, glycerol trimethacrylate, α,α'-dibromo-p-xylene, α,α',α"-tribromo-mesitylene, and the like. Subsequent deprotection affords functionalized polar stars.

In contrast to star polymers of the prior art, the molecular architecture of compounds of the present invention can be precisely controlled. For example, each arm of the multi-arm polymer can contain a functional group (protected or non-protected), and the functional groups (and/or protecting groups) can be the same or different. The star polymers can also include both functional and non-functional ends. The nature of the functional group, and/or protecting group, and/or non-functional group can be varied simply by changing the initiator, and the ratio of one functional group to another functional group, or of one functional group to a non-functional group, can be adjusted by simply varying the ratio of initiators to one another. Further, monomer identity, monomer composition and molecular weight of both functional and non-functional arms can be independently manipulated by varying the monomer charged by each initiator. Still further, the number of polymer arms can be adjusted by varying the nature of the coupling agent, and the ratio of living polymer to the coupling agent.

DETAILED DESCRIPTION OF THE INVENTION

The polar polymers of the present invention have the following formula:

(I)

or

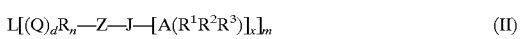

(II)

wherein FG is H or a protected or non-protected functional group; Q is a hydrocarbyl group derived by incorporation of a polar monomer selected from group consisting of esters, amides, and nitrites of acrylic and methacrylic acid, and mixtures thereof with one another and/or with other polar monomers; d is an integer from 10 to 2000; R is a saturated or unsaturated hydrocarbyl group derived by incorporation of a compound selected from the group consisting of conjugated diene hydrocarbons, alkenylsubstituted aromatic hydrocarbons, and mixtures thereof; n is an integer from 0 to 5; Z is a branched or straight chain hydrocarbon group which contains 3–25 carbon atoms, optionally containing aryl or substituted aryl groups; J is oxygen, sulfur, or nitrogen; $[A(R^1R^2R^3)]_x$ is a protecting group, in which A is an element selected from Group IVa of the Periodic Table of Elements; $R^1$, $R^2$, and $R^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen. L in formula II is a linking agent selected from the group consisting of reactive halogen compounds and multifunctional acrylates, as described below.

Removal of the protecting group (deprotection) produces polymers with oxygen, sulfur or nitrogen functional groups on the ends of the polymers. The residual aliphatic unsaturation can be optionally removed by hydrogenation before or after removal of the protecting groups. These functional groups can then participate in various copolymerization reactions by reaction of the functional groups on the ends of the polymer with selected difunctional or polyfunctional comonomers and/or linking or coupling agents, as described in more detail below.

The polar monomer to be anionically polymerized is chosen from the group of organic compounds that can be polymerized anionically (i.e. in a reaction initiated by an organo-alkali metal), and preferably is selected from group consisting of esters, amides, and nitriles of acrylic and methacrylic acid, and mixtures thereof. The polar monomers may be polymerized singly, as a mixture thereof with one another and/or other polar monomers, to form random or tapered copolymers, or sequentially with one another and/or other polar monomers to form block copolymers.

Exemplary polar monomers include, without limitation, methyl methacrylate, methyl acrylate, t-butyl methacrylate, t-butyl acrylate, ethyl methacrylate, N,N-dimethylacrylamide, lauryl methacrylate, stearyl methacrylate, 2,3-epoxypropyl methacrylate, decyl methacrylate, and octyl methacrylate. For reference, see Macromolecules, 14, 1599 (1981); Polymer 31, 106 (1990); Polymer, 34, 2875 (1993).

The process of the invention generally comprises initiating polymerization of a polar monomer as described above in a polar, hydrocarbon, or mixed hydrocarbon-polar solvent medium, preferably at a temperature of −80° C. to 20° C., with a protected functional organolithium initiator to form an intermediate mono-protected mono-functional living anion. Preferably, the initiator is reacted with an appropriate diaryl alkenyl group, such as 1,1-diphenylethylene, to provide a stabilized carbanion prior to polymerization. The protected functional organolithium initiators can be reacted with polar monomers either singly, sequentially, or as mixtures thereof with one another or with other polar comonomers.

The mono-protected mono-functional living anion can be quenched or terminated by addition of a suitable proton donor, such as methanol, isopropanol, acetic acid, and the like, to provide a mono-functional polar polymer. Alternatively, polymerization can be followed by functionalization of the resultant living anion with a suitable electrophile to provide a mono-protected, di-functional polymer. The di-functional polymer may be telechelic, i.e., contain two functional groups, which are the same, per molecule at the termini of the polymer. The polymer can also be heterotelechelic, having different functionalities at opposite ends of the polymer chain. This is represented schematically by the formula A - - - B, wherein A and B are different functional groups.

Electrophiles that are useful in functionalizing the polymeric living anion include, but are not limited to, alkylene oxides, such as ethylene oxide, propylene oxide, styrene oxide, and oxetane; oxygen; sulfur; carbon dioxide; halogens such as chlorine, bromine and iodine; alkenylhalosilanes, omega-alkenylarylhalosilanes, and haloalkyltrialkoxysilanes, such as chlorotrimethylsilane and styrenyldimethyl chlorosilane; sulfonated compounds, such as 1,3-propane sultone; amides, including cyclic amides, such as caprolactam, N-benzylidene trimethylsilylamide, and dimethyl formamide; silicon acetals; 1,5-diazabicyclo [3.1.0]hexane; allyl halides, such as allyl bromide and allyl chloride; methacryloyl chloride; amines, including primary, secondary, tertiary and cyclic amines, such as 3-(dimethylamino)-propyl chloride and N-(benzylidene) trimethylsilylamine; epihalohydrins, such as epichlorohydrin, epibromohydrin, and epiiodohydrin, and other materials as known in the art to be useful for terminating or end capping polymers. These and other useful functionalizing agents are described, for example, in U.S. Pat. Nos. 3,786,116 and 4,409,357, the entire disclosure of each of which is incorporated herein by reference. The polymer is optionally hydrogenated, either before or after removal of the protecting group, or before or after functionalization.

Exemplary organolithium initiators useful in the present invention include initiators selected from the group consisting of omega-(tert-alkoxy)-1-alkyllithiums, omega-(tert-alkoxy)-1-alkyllithiums chain extended with conjugated alkadienes, alkenylsubstituted aromatic hydrocarbons, and mixtures thereof, omega-(tert-alkylthio)-1-alkyllithiums, omega-(tert-alkylthio)-1-alkyllithiums chain extended with conjugated alkadienes, alkenylsubstituted aromatic hydrocarbons, and mixtures thereof, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with conjugated alkadienes, alkenylsubstituted aromatic hydrocarbons, and mixtures thereof, and omega-(bis-tert-alkylsilylamino)-1-alkyllithiums.

Initiators useful in the preparation of polymers of the present invention are also represented by the following formula:

$$M—R_n—Z—J—[A(R^1R^2R^3)]_x \quad (III)$$

wherein M is an alkali metal; R is a saturated or unsaturated hydrocarbyl group derived by incorporation of a compound selected from the group consisting of conjugated diene hydrocarbons, alkenylsubstituted aromatic hydrocarbons, and mixtures thereof; n is an integer from 0 to 5; Z is a branched or straight chain hydrocarbon group which contains 3–25 carbon atoms, optionally containing aryl or substituted aryl groups; J is a hetero atom, e.g., oxygen, sulfur, or nitrogen; A is an element selected from Group IVa of the Periodic Table of Elements; $R^1$, $R^2$, and $R^3$ are each independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen.

These initiators (III) can be prepared by reaction of protected organolithium compounds of the following formula:

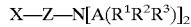

wherein each of M, Z, J, A, $R^1$, $R^2$, $R^3$, and x are the same as defined above, with one or more conjugated alkadienes (such as butadiene or isoprene), alkenylsubstituted aromatic hydrocarbons (such as styrene or alpha-methylstyrene), and mixtures thereof, to form an extended hydrocarbon chain between M and Z in Formula (IV), which extended chain is denoted as $R_n$ in Formula (III). As noted above, the initiator is adducted to an appropriate diphenyl alkenyl group, such as 1,1-diphenylethylene, to provide a stabilized carbanion prior to polymerization.

The compounds of Formula (IV) can be prepared by reacting in an inert solvent a selected tertiary amino-1-haloalkane, omega-hydroxy-protected-1-haloalkane, or omega-thio-protected-1-haloalkane, depending on whether J is to be N, O or S, (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional alkali metal initiator (of Formula IV), which is then optionally reacted with a one or more conjugated diene hydrocarbons, one or more alkenyl-substituted aromatic hydrocarbons, or mixtures of one or more dienes with one or more alkenylsubstituted aromatic hydrocarbons, in a predominantly alkane, cycloalkane, or aromatic reaction solvent, which solvent contains 5 to 10 carbon atoms, and mixtures of such solvents to produce a monofunctional initiator with an extended chain or tether between the metal atom (M) and element (J) in Formula (III) above and mixtures thereof with compounds of Formula (IV). R in Formula (III) is preferably derived from conjugated 1,3-dienes. While A in the protecting group $[A(R^1R^2R^3)]$ of the formulae above can be any of the elements in Group IVa of the Periodic Table of the Elements, carbon and silicon currently appear the most useful, especially when polymerizing conjugated dienes.

Incorporation of R groups into the M—Z linkage to form the compounds of Formula (III) above involves addition of compounds of the Formula

where the symbols have the meanings ascribed above, across the carbon to carbon double bonds in compounds selected from the consisting of one or more conjugated diene hydrocarbons, one or more alkenylsubstituted aromatic hydrocarbons, or mixtures of one or more dienes with one or more alkenylsubstituted aromatic hydrocarbons, to produce new carbon-lithium bonds of an allylic or benzylic nature, much like those found in a propagating polyalkadiene or polyarylethylene polymer chain derived by anionic initiation of the polymerization of conjugated dienes or arylethylenes. These new carbon-lithium bonds are now activated toward polymerization and so are much more efficient in promoting polymerization than the precursor M—Z (M=Li) bonds themselves.

Tertiary amino-1-haloalkanes useful in practicing this invention are compounds of the following general structures:

and

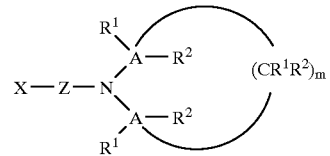

wherein X is halogen, preferably chlorine or bromine; Z is a branched or straight chain hydrocarbon tether or connecting group which contains 3–25 carbon atoms, which tether may also contain aryl or substituted aryl groups; A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms; and m is an integer from 1 to 7, and their employment as initiators in the anionic polymerization of olefin containing monomers in an inert, hydrocarbon solvent optionally containing a Lewis base. The process reacts selected tertiary amino-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the tertiary amine initiators are conducted in an inert solvent, preferably a non-polar solvent, optionally containing an ethereal modifier, using an olefinic monomer which is an alkenyl-substituted aromatic hydrocarbon or a 1,3-diene at a temperature of about −30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

Tertiary amino-1-haloalkanes useful in the practice of this invention include, but are not limited to, 3-(N,N-dimethylamino)-1-propyl halide, 3-(N,N-dimethylamino)-2-methyl-1-propyl halide, 3-(N,N-dimethylamino)-2,2-dimethyl-1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-diethylamino)-2-methyl-1-propyl halide, 3-(N,N-diethylamino)-2,2-dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N-methylamino)-1-pentyl halide, 6-(N-ethyl-N-methylamino)-1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(N-isopropyl-N-methyl)-1-propyl halide, 2-(N-isopropyl-N-methyl)-2-methyl-1-propyl halide, 3-(N-isopropyl-N-methyl)-2,2-dimethyl-1-propyl halide, and 4-(N-isopropyl-N-methyl)-1-butyl halide. The halo- or halide group is preferably selected from chlorine and bromine.

Omega-hydroxy-protected-1-haloalkanes useful in producing monofunctional ether initiators useful in practicing this invention have the following general structure:

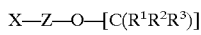

X—Z—O—[C(R$^1$R$^2$R$^3$)]

wherein X is halogen, preferably chlorine or bromine; Z is a branched or straight chain hydrocarbon group which contains 3–25 carbon atoms, optionally containing aryl or substituted aryl groups; and R$^1$, R$^2$, and R$^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional ether initiators are conducted in an inert solvent, preferably a non-polar solvent, optionally containing an ethereal modifier, using an olefinic monomer which is an alkenyl-substituted aromatic hydrocarbon or a 1,3-diene at a temperature of about −30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

The precursor omega-protected-1-haloalkanes (halides) can be prepared from the corresponding haloalcohol by standard literature methods. For example, 3-(1,1-dimethylethoxy)-1-chloropropane can be synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X. Franck and A. Cave, Tetrahedron Letters, 34, 1993, 5893, which involves the reaction of the appropriate alcohol with 2-methyl-2-butene catalyzed by boron trifluoride etherate, can be employed for the preparation of the t-amyl ethers. The alkoxy, alkylthio or dialkylamino substituted ethers, for example 6-[3-(methylthio)-1-propyloxy]-1-chlorohexane, can be synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, can be synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, can be prepared by the reaction of the haloalcohol with triphenylmethylchloride, according to the method of S. K. Chaudhary and O. Hernandez, Tetrahedron Letters, 1979, 95.

Omega-hydroxy-protected-1-haloalkanes prepared in accordance with this earlier process useful in practicing this invention include, but are not limited to, 3-(1,1-dimethylethoxy)-1-propyl halide, 3-(1,1-dimethylethoxy)-2-methyl-1-propyl halide, 3-(1,1-dimethylethoxy)-2,2-dimethyl-1-propyl halide, 4-(1,1-dimethylethoxy)-1-butyl halide, 5-(1,1-dimethylethoxy)-1-pentyl halide, 6-(1,1-dimethylethoxy)-1-hexyl halide, 8-(1,1-dimethylethoxy)-1-octyl halide, 3-(1,1-dimethylpropoxy)-1-propyl halide, 3-(1,1-dimethylpropoxy)-2-methyl-1-propyl halide, 3-(1,1-dimethylpropoxy)-2,2-dimethyl-1-propyl halide, 4-(1,1-dimethylpropoxy)-1-butyl halide, 5-(1,1-dimethylpropoxy)-1-pentyl halide, 6-(1,1-dimethylpropoxy)-1-hexyl halide, 8-(1,1-dimethylpropoxy)-1-octyl halide, 4-(methoxy)-1-butyl halide, 4-(ethoxy)-1-butyl halide, 4-(propyloxy)-1-butyl halide, 4-(1-methylethoxy)-1-butyl halide, 3-(triphenylmethoxy)-2,2-dimethyl-1-propyl halide, 4-(triphenylmethoxy)-1-butyl halide, 3-[3-(dimethylamino)-1-propyloxy]-1-propyl halide, 3-[2-(dimethylamino)-1-ethoxy]-1-propyl halide, 3-[2-(diethylamino)-1-ethoxy]-1-propyl halide, 3-[2-(diisopropyl)amino)-1-ethoxy]-1-propyl halide, 3-[2-(1-piperidino)-1-ethoxy]-1-propyl halide, 3-[2-(1-pyrrolidino)-1-ethoxy]-1-propyl halide, 4-[3-(dimethylamino)-1-propyloxy]-1-butyl halide, 6-[2-(1-piperidino)-1-ethoxy]-1-hexyl halide, 3-[2-(methoxy)-1-ethoxy]-1-propyl halide, 3-[2-(ethoxy)-1-ethoxy]-1-propyl halide, 4-[2-(methoxy)-1-ethoxy]-1-butyl halide, 5-[2-(ethoxy)-1-ethoxy]-1-pentyl halide, 3-[3-(methylthio)-1-propyloxy]-1-propyl halide, 3-[4-(methylthio)-1-butyloxy]-1-propyl halide, 3-(methylthiomethoxy)-1-propyl halide, 6-[3-(methylthio)-1-propyloxy]-1-hexyl halide, 3-[4-(methoxy)-benzyloxy]-1-propyl halide, 3-[4-(1,1-dimethylethoxy)-benzyloxy]-1-propyl halide, 3-[2,4-(dimethoxy)-benzyloxy]-1-propyl halide, 8-[4-(methoxy)-benzyloxy]-1-octyl halide, 4-[4-(methylthio)-benzyloxy]-1-butyl halide, 3-[4-(dimethylamino)-benzyloxy]-1-propyl halide, 6-[4-(dimethylamino)-benzyloxy]-1-hexyl halide, 5-(triphenylmethoxy)-1-pentyl halide, 6-(triphenylmethoxy)-1-hexyl halide, and 8-(triphenylmethoxy)-1-octyl halide. The halo- or halide group is preferably selected from chlorine and bromine.

U.S. Pat. No. 5,362,699 discloses a process for the preparation of hydrocarbon solutions of monofunctional ether initiators derived from omega-hydroxy-silyl-protected-1-haloalkanes of the following general structure:

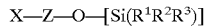

X—Z—O—[Si(R$^1$R$^2$R$^3$)]

wherein X is halogen, preferably chlorine or bromine; Z is a branched or straight chain hydrocarbon group which contains 3–25 carbon atoms, optionally containing aryl or substituted aryl groups; and R¹, R², and R³ are independently defined as saturated and unsaturated aliphatic and aromatic radicals, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 25° C. and about 40° C., in an alkane or cycloalkane reaction solvent containing 5 to 10 carbon atoms and mixtures of such solvents.

Anionic polymerizations employing the monofunctional siloxy ether initiators are conducted in an inert solvent, preferably a non-polar solvent, optionally containing an ethereal modifier, using an olefinic monomer which is an alkenylsubstituted aromatic hydrocarbon or a 1,3-diene at a temperature of about −30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

Omega-silyl-protected-1-haloalkanes prepared in accordance with this earlier process useful in practicing this invention include, but are not limited to, 3-(t-butyldimethylsilyloxy)-1-propyl halide, 3-(t-butyldimethylsilyloxy)-2-methyl-1-propyl halide, 3-(t-butyldimethylsilyloxy)-2,2-dimethyl-1-propyl halide, 4-(t-butyldimethylsilyloxy)-1-butyl halide, 5-(t-butyldimethylsilyloxy)-1-pentyl halide, 6-(t-butyldimethylsilyloxy)-1-hexyl halide, 8-(t-butyldimethylsilyloxy)-1-octyl halide, 3-(t-butyldiphenylylsilyloxy)-1-propyl halide, 3-(t-butyldiphenylylsilyloxy)-2-methyl-1-propyl halide, 3-(t-butyldiphenylylsilyloxy)-2,2-dimethyl-1-propyl halide, 4-(t-butyldiphenylylsilyloxy)-1-butyl halide, 6-(t-butyldiphenylsilyloxy)-1-hexyl halide and 3-(trimethylsilyloxy)-2,2-dimethyl-1-propyl halide. The halo- or halide group is preferably selected from chlorine and bromine.

Monofunctional thioether initiators useful in the practice of this invention are derived from omega- thio-protected-1-haloalkanes of the following general structure:

wherein X is halogen, preferably chlorine or bromine; Z is a branched or straight chain hydrocarbon group which contains 3–25 carbon atoms, optionally containing aryl or substituted aryl groups; [A(R¹R²R³)] is a protecting group in which A is an element selected from Group IVa of the Periodic Table of the Elements, and R¹, R², and R³ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and their employment as initiators in the anionic polymerization of olefin containing monomers in an inert, hydrocarbon solvent optionally containing a Lewis base. The process reacts selected omega-thioprotected-1-haloalkyls whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional thioether initiators are conducted in an inert solvent, preferably a non-polar solvent, optionally containing an ethereal modifier, using an olefinic monomer which is an alkenyl-substituted aromatic hydrocarbon or a 1,3-diene at a temperature of about −30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

The initiator precursor, omega-thio-protected-1-haloalkanes (halides), can be prepared from the corresponding halothiol by standard literature methods. For example, 3-(1,1-dimethylethylthio)-1-propylchloride can be synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylethylthiol with 1-bromo-3-chloropropane and a base affords 3-(1,1-dimethylethylthio)-1-propylchloride. The method of B. Figadere, X. Franck and A. Cave, Tetrahedron Letters, 34, 1993, 5893, which involves the reaction of the appropriate thiol with 2-methyl-2-butene catalyzed by boron trifluoride etherate, can be employed for the preparation of the t-amyl ethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chloride, as taught by D. F. Taber and Y. Wang, J. Org, Chem., 58, 1993, 6470. Methoxymethylthio compounds, such as 6-(methoxymethylthio)-1-hexylchloride, can be prepared by the reaction of the omega-chloro-thiol with bromochloromethane, methanol, and potassium hydroxide, by the method of F. D. Toste and I. W. J. Still, Synlett, 1995, 159. T-Butyldimethylsilyl protected compounds, for example 4-(t-butyldimethylsilylthio)-1-butylhalide, can be prepared from t-butyldimethylchlorosilane, and the corresponding thiol, according to the method described in U.S. Pat. No. 5,493,044.

Omega-thio-protected 1-haloalkanes prepared in accordance with this earlier process useful in practicing this invention include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3-(methoxymethylthio)-1-propylhalide, 3-(methoxymethylthio)-2-methyl-1-propylhalide, 3-(methoxymethylthio)-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1-dimethylethylthio)-1-hexylhalide, 8-(1,1-dimethylethylthio)-1-octylhalide, 3-(1,1- dimethylpropylthio)-1-propylhalide, 3-(1,1-dimethylpropylthio)-2-methyl-1-propylhalide, 3-(1,1-dimethylpropylthio)-2,2-dimethyl-1-propylhalide, 4-(1,1-dimethylpropylthio)-1-butylhalide, 5-(1,1-dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl-1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexylhalide, 8-(cyclopentylthio)-1-octylhalide, 3-(cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t-butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butylhalide, 6-(t-butyldimethylsilylthio)-1-hexylhalide and 3-(trimethylsilylthio)-2,2-dimethyl-1-propylhalide. The halo- or halide group is preferably selected from chlorine and bromine.

Examples of functionalized organolithium initiators (III) include, but are not limited to, tert-alkoxy-alkyllithiums such as 3-(1,1-dimethylethoxy)-1-propyllithium and its more hydrocarbon-soluble isoprene chain-extended oligomeric analog (n=2), 3-(tert-butyldimethylsilyloxy)-1-propyllithium (n=0), tert-alkylthio-alkyllithiums such as 3-(1,1-dimethylethylthio)-1-propyllithium and its more hydrocarbon-soluble isoprene chain-extended oligomeric analog (n=2), 3-(dimethylamino)-1-propyllithium and its more hydrocarbon-soluble isoprene chain-extended oligomeric analog (n=2) and 3-(di-tert-butyldimethylsilylamino)-1-propyllithium, and mixtures thereof. Further examples of protected functionalized initiators that may be employed in this invention include, but are not limited to, 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 3-[3-(dimethylamino)-1-propyloxy]-1-propyllithium, 3-[2-(dimethylamino)-1-ethoxy]-1-propyllithium, 3-[2 -(diethylamino)-1-ethoxy]-1-propyllithium, 3-[2-(diisopropyl)amino]-1-ethoxy]-1-propyllithium, 3-[2-(1-piperidino)-1-ethoxy]-1-propyllithium, 3-[2-(1-pyrrolidino)-1-ethoxy]-1-propyllithium, 4-[3-(dimethylamino)-1-propyloxy]-1-butyllithium, 6-[2-(1-piperidino)-1-ethoxy]-1-hexyllithium, 3-[2-(methoxy)-1-ethoxy]-1-propyllithium, 3-[2-(ethoxy)-1-ethoxy]-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium and their more hydrocarbon soluble conjugated alkadiene, alkenylsubstituted aromatic hydrocarbon, and mixtures thereof, chain extended oligomeric analogs (n=1–5).

Functionalized polymers of Formula (I) can be further reacted with other comonomers such as di or polyesters, di- or polyisocyanates, di-, poly-, or cyclic amides, di- and polycarboxylic acids, and di- and polyols in the presence of a strong acid catalyst to simultaneously deprotect the functional polymer and polymerize both functional ends thereof to produce novel segmented block polymers. Alternatively, the functional polymer of Formula (I) can be reacted with other comonomers in the absence of a strong acid catalyst to yield block copolymers, while maintaining the integrity of the protective group to provide a functional block copolymer. Still another alternative is to remove the protective group of the functional polymer of Formula (I) and to polymerize a functional block copolymer of the preceding sentence with the same or other comonomers to produce novel segmented block polymers.

The polymerization solvent is preferably a polar solvent, although a hydrocarbon, or mixtures of polar and hydrocarbon solvents can be used. Examples of polar solvents include, but are not limited to, diethyl ether, dibutyl ether, tetrahydrofuran, 2-methyltetrahydrofuran, methyl tert-butyl ether, diazabicyclo[2.2.2]octane, triethylamine, tributylamine, N,N,N',N'-tetramethylethylene diamine (TMEDA), and 1,2-dimethoxyethane (glyme).

Inert hydrocarbon solvents useful in practicing this invention include, but are not limited to, inert liquid alkanes, cycloalkanes and aromatic solvents such as alkanes and cycloalkanes containing five to ten carbon atoms, such as pentane, hexane, cyclohexane, methylcyclohexane, heptane, methylcycloheptane, octane, decane and the like, and aromatic solvents containing six to ten carbon atoms such as toluene, ethylbenzene, p-xylene, m-xylene, o-xylene, n-propylbenzene, isopropylbenzene, n-butylbenzene, and the like. The amount of the inert solvent added depends on factors such as the nature of the monomer, the temperature of the polymerization, and the identity of the inert solvent.

As noted above, if desired, the protecting groups can be removed from the polymer. This deprotection can be performed either prior to or after the optional hydrogenation of the residual aliphatic unsaturation. For example, to remove tert-alkyl-protected groups, the protected polymer can be mixed with Amberlyst® 15 ion exchange resin and heated at an elevated temperature, for example 150° C., until deprotection is complete. Tert-alkyl-protected groups can also be removed by reaction of the polymer with para-toluenesulfonic acid, trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, N.Y., 1991, page 41.

Tert-butyldimethylsilyl protecting groups can be removed by treatment of the polymer with acid, such as hydrochloric acid, acetic acid, para-toluenesulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, N.Y., 1991, pages 80–83.

In addition, protecting groups can be selectively removed from the polymer, i.e., deprotecting conditions can be selected so as to remove at least one protecting group without removing other dissimilar protecting groups, by proper selection of deprotecting reagents and conditions.

The following table details representative experimental conditions capable of selectively removing protecting groups (more labile) while maintaining the integrity of other different protecting groups (more stable).

| Labile | Stable | Conditions |
| --- | --- | --- |
| t-butyldimethylsilyl | t-butyl | tetrabutylammonium fluoride |
| t-butyldimethylsilyl | t-butyl | 1 N HCL |
| t-butyldimethylsilyl | dialkylamino | tetrabutylammonium fluoride |
| t-butyldimethylsilyl | dialkylamino | 1 N HCL |
| t-butyl | dialkylamino | Amberlyst ® resin |
| t-amyl | dialkylamino | Amberlyst ® resin |
| trimethylsilyl | t-butyl | tetrabutylammonium fluoride |
| trimethylsilyl | t-butyl | 1 N HCl |
| trimethylsilyl | dialkylamino | tetrabutylammonium fluoride |
| trimethylsilyl | dialkylamino | 1 N HCl |

The progress of the deprotection reactions can be monitored by conventional analytical techniques, such as Thin Layer Chromatography (TLC), Nuclear Magnetic Resonance (NMR), or InfraRed (IR) spectroscopy.

Examples of methods to hydrogenate the polymers of this invention are described in U.S. Pat. Nos. 4,970,254, 5,166,277, 5,393,843 and 5,496,898, the entire disclosure of each of which is incorporated by reference. The hydrogenation of the polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by Infra-Red (IR) spectroscopy or Nuclear Magnetic Resonance (NMR) spectroscopy. The hydrogenation reaction is conducted until at least 90% of the aliphatic unsaturation has been saturated. The hydrogenated polymer is then recovered by conventional procedures, such as removal of the catalyst with aqueous acid wash, followed by solvent removal or precipitation of the polymer.

In another aspect of the invention, multi-branched or star-shaped polymers which include polar monomers are also provided, including multi-branched or star-shaped polymers with protected functional groups, their optionally hydrogenated analogues, and the polymers produced by removal of the protecting groups. The star polymers in this aspect of the invention can be produced using the functional initiators (III) described above (singly or combinations thereof), which, by design, incorporate the versatility of functional branch end star polymers. For example, hydroxy-, thio-, and/or amino-terminated functional branches can be copolymerized with comonomers, such as organic diacids (such as carboxylic acids), diisocyanates, and the like. The copolymers can also include non-functional branches in the polymer to provide improved impact resistance in molecules resulting from further copolymerization of the star-shaped polymers of the invention with other functional comonomers, for example, resultant polyester and/or polyamide molecules.

Novel multi-branched or star-shaped polymers having functional ends can be produced by polymerizing polar monomers, either singly, sequentially, or as mixtures thereof, with protected functional organolithium initiators of Formula (III) above (singly or combinations thereof to provide arms having different protecting groups and/or different functional groups), and subsequently reacting the resulting polymer with suitable multifunctional linking agents. This can lead to polymer anion chain lengths of approximately the same size.

Suitable linking or coupling agents include, without limitation, reactive halogen compounds, such as α,α'-dibromo-p-xylene and α,α',α"-tribromo-mesitylene, multifunctional acrylates, such as ethylene glycol dimethylacrylate, glycerol trimethacrylate, and the like. This linking process is described by J. W. Mays et al. in Polymer International, 33 171 (1994). Mixtures of coupling agents may also be used. Generally, the amount of coupling agent used is such that the molar ratio of protected living polymer anions to coupling agent ranges from 1:1 to 24:1.

These radiating multi-arm polymers with protected functionality on the ends of the arms may be optionally hydrogenated before or after removal of the protecting groups. The star polymers thus formed may have hydroxyl, thio, and/or amino functional branch ends.

Nonfunctional initiators (such as n-butyllithium, sec-butyllithium, and tert-butyllithium) may also be mixed with the functional initiators of Formula (III) to provide non-functional branch ends as well, which can serve to modify the physical properties of these star-shaped or radiating polymers, especially after their further copolymerization with other functional monomers, such as organic diacids or organic diisocyanates.

Alternatively, novel multi-branched or star-shaped polymers as in Formula II possessing functional ends (which may be the same or different), and/or both functional and non-functional ends, may be produced by separately polymerizing polar monomers with protected functional initiators and/or with non-functional organometallic initiators to separately produce polymer anions, subsequently mixing the resulting separately produced polymer anions, treating the resulting mixture with multifunctional linking agents, and optionally hydrogenating before or after optionally deprotecting the functional ends of the polymer. This alternative method allows for control of the molecular weight of the arms of the star polymer (for example, different polymer anion chain lengths can be produced) and provides for a more selective control of the physical properties of the resultant polymers.

If desired, the protecting groups can be removed from the arms of the star polymer, prior to or after the optional hydrogenation of the residual unsaturation of the arms, using the techniques described above. This includes selective deprotection when dissimilarly protected functional groups are present, as detailed above.

Molecular weights of the resulting linked or coupled polymers can vary depending on the molecular weight of the polymer anion and the number of potential functional linking groups on a coupling agent. The sizes of the branches of the linked polymer can be the same or vary.

For example, a protected functional living polymer of this invention can be generated by reacting 1,1-diphenylethylene with 3-(t-butoxy-)propyllithium initiator in THF at −78° C. (Equation 1) followed by polymerization of methyl methacrylate (Equation 2), also in THF at −78° C.:

Equation 1

$(CH_3)_3CO(CH_2)_3Li + (C_6H_5)_2C=CH_2 \longrightarrow$

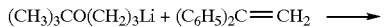

$(CH_3)_3CO(CH_2)_3CH_2C(C_6H_5)_2Li$ (V)

Equation 2

$(V) + xCH_2=C(CH_3)-CO_2CH_3 \longrightarrow$

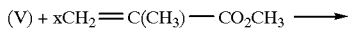

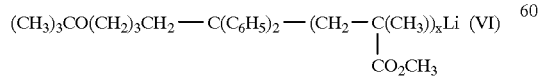

$(CH_3)_3CO(CH_2)_3CH_2-C(C_6H_5)_2-(CH_2-C(CH_3))_xLi$ (VI)
$\quad\quad\quad\quad\quad\quad\quad\quad\quad\quad\quad\quad\quad\quad\quad\quad\quad | $
$\quad\quad\quad\quad\quad\quad\quad\quad\quad\quad\quad\quad\quad\quad\quad\quad\quad CO_2CH_3$ The living polymer (VI) may be reacted, for example, with ethylene oxide (Equation 3) to yield a compound of formula (VII), followed by hydrolysis (Equation 4) to produce (VIII), Equation 3

$(VI) + \underset{O}{CH_2\!\!-\!\!CH_2} \longrightarrow$

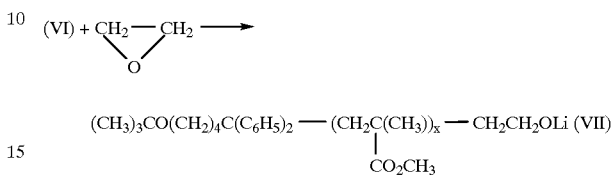

$(CH_3)_3CO(CH_2)_4C(C_6H_5)_2-(CH_2C(CH_3))_x-CH_2CH_2OLi$ (VII)
$\quad\quad\quad\quad\quad\quad\quad\quad\quad\quad\quad\quad | $
$\quad\quad\quad\quad\quad\quad\quad\quad\quad\quad\quad\quad CO_2CH_3$ Equation 4

$(VII) + MeOH/HCl \longrightarrow$

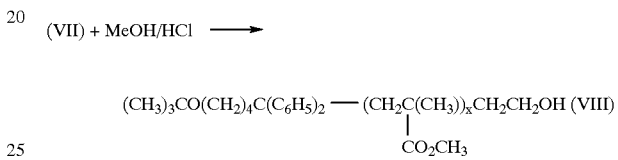

$(CH_3)_3CO(CH_2)_4C(C_6H_5)_2-(CH_2C(CH_3))_xCH_2CH_2OH$ (VIII)
$\quad\quad\quad\quad\quad\quad\quad\quad\quad\quad\quad\quad | $
$\quad\quad\quad\quad\quad\quad\quad\quad\quad\quad\quad\quad CO_2CH_3$ which may optionally be hydrogenated. Deprotection of polymer (VIII) (Equation 5), for example with dilute para-toluenesulfonic acid, would generate the dihydroxy polymer (IX)

Equation 5

$(VIII) + H_2O/HCl \longrightarrow$

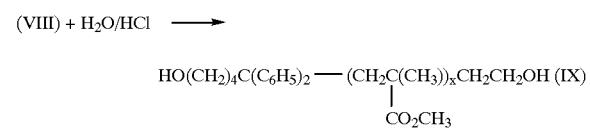

$HO(CH_2)_4C(C_6H_5)_2-(CH_2C(CH_3))_xCH_2CH_2OH$ (IX)
$\quad\quad\quad\quad\quad\quad\quad\quad\quad | $
$\quad\quad\quad\quad\quad\quad\quad\quad\quad CO_2CH_3$ which contains a functional group on each of the termini of the polymer.

Linking agents, such as those described above, may be used on the active lithium-containing polymer (VI) above to yield polymers, including star polymers having multiple(s) of the molecular weight of the arms, and following this coupling procedure by the deprotective treatment described in Equation 5 above, to once again yield telechelically functional polymers. Thus:

Equation 6

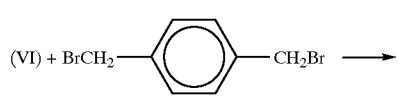

$(VI) + BrCH_2\!\!-\!\!\!\!\bigcirc\!\!\!\!-\!\!CH_2Br \longrightarrow$

-continued

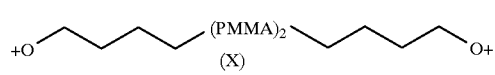

Equation 7

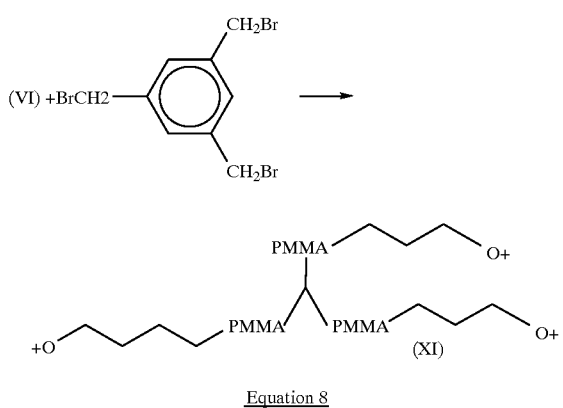

Equation 8

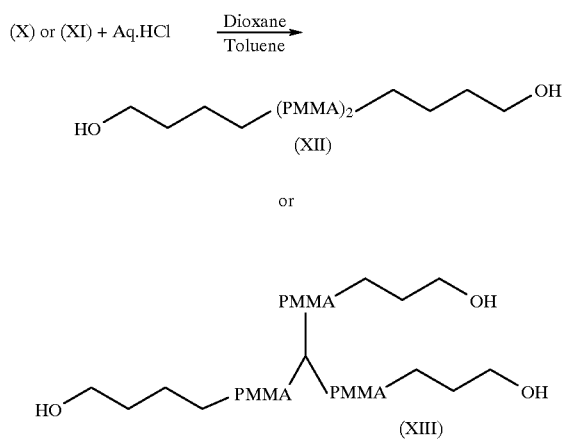

Additionally, a wide variety of symmetrically or asymmetrically functional polymers may be produced by reacting the living polymer (VI) above with various functionalizing agents. For example, addition of carbon dioxide (see J.Polym.Sci., Polym.Chem. 30, 2349 (1992)) to polymer (VI) would produce a polymer with one protected hydroxyl and one carboxyl group, or the living polymer (VI) may be reacted with 1,5 diazabicyclo-(3.1.0) hexane as described in U.S. Pat. No. 4,753,991 to produce a polymer with one protected hydroxyl and one amino group. A polymer with one protected hydroxyl group and one protected amino group can be prepared by reaction of the living anion (VI) with a protected amino propyl bromide, see Macromolecules, 23, 939 (1990). Reaction of the living polymer anion (VI) with oxetane or substituted oxetanes (see U.S. Pat. No. 5,391,637) would afford a polymer which contained one protected hydroxyl and a hydroxyl group. A polymer with two protected hydroxyl groups can be prepared by reaction of the living anion (VI) with a silicon derived acetal, see U.S. Pat. No. 5,478,899.

Other asymmetrically substituted monofunctional polymers may be produced having epoxy or isocyanate groups at one end, for example, by reacting the lithium salt (VII) above (before hydrolysis), with epichlorohydrin or, by reacting (VIII) itself with an equivalent of a diisocyanate, such as methylene 4,4-diphenyl diisocyanate (2/1 NCO/OH). These unsymmetrically substituted monofunctional polymers could then be further reacted with other comonomers either with or without simultaneous deprotection as described below.

The protected dihydroxy polymers (VIII) alone and in their hydrogenated forms could be used as base materials to lend flexibility and higher impact strength in a number of formulas to produce coatings, sealants, binders and block copolymers with polyesters, polyamides and polycarbonates as described in UK Patent Application GB2270317A and in "Polytail" data sheets and brochures (Mitsubishi Kasei America).

In the presence of acidic catalysts used to promote the formation of many of these block copolymer resins, the protective group of the hydrogenated polymer is removed as well, allowing the exposed hydroxyl grouping in the base polymer molecule to simultaneously participate in the block copolymer reaction.

For example, hydrogenated polymers (VIII) may be reacted with bisphenol A and phosgene in the presence of appropriate catalysts with simultaneous deprotection to yield a polycarbonate alternating block copolymer. The resulting products are useful as molding resins, for example, to prepare interior components for automobiles.

A segmented polyamide-hydrogenated block copolymer is also useful as a molding composition to prepare exterior automotive components and can be prepared, for example, by reacting hydrogenated (VIII) polymer with caprolactam or adipic acid and a diamine in the presence of a suitable catalyst.

A segmented polyester-hydrogenated block copolymer is produced by reaction of hydrogenated (VIII) polymer with dimethyl terephthalate and a diol along with a suitable acidic catalyst. Again, the products are useful as molding compounds for exterior automotive components.

Isocyanate-terminated prepolymers can be produced from hydrogenated (VIII) polymers by reaction with suitable diisocyanates (2/1 NCO/OH) as above and which can be further reacted with diols and additional diisocyanates to form segmented polyurethanes useful for water based, low VOC coatings. Inclusion of acid functional diols, such as dimethylolpropionic acid, in the polyurethane introduces pendant carboxyl groups which can be neutralized with tertiary amines to afford water dispersable polyolefin/polyurethane segmented polymers, useful for water based coatings. This same principle could be applied to acrylic polymers made with tertiary amine functional monomers included, which could be made by free radical polymerization following reacting the hydroxyl groups at the terminal ends of the polymer with acryloyl chloride or methacryloyl chloride. Segmented polyurethane prepolymers may be mixed with tackifying resins and used as a moisture-curable sealant, caulk or coating.

Another possible application in coatings would be the use of new dendrimers, based on the use of the polymer with hydroxyl functionality at the termini thereof to form the core for dendritic hybrid macromolecules based on condensation or addition polymerizations, utilizing the hydroxyl functionality as the initiating site (see, for example Gitsov and Frechet, American Chemical Society PMSE Preprints, Volume 73, August 1995.

Yet another application includes use as toughening polymers for epoxy composites, utilizing the polymer core with the hydroxyl groups converted to half esters by reaction with anhydrides. These epoxy reactive polymers can then be utilized as reactants with epoxy resins and amines in composite systems. Reacting the hydroxyl functional polymers into unsaturated polyesters provides a new polymer toughening system for polyester molding compounds for automotive and other uses. For a review of the use of linear polymers for toughening of epoxies and polyesters, see "Rubber-Toughened Plastics", Edited By C. Keith Riew, ACS Advances in Chemistry Series, #222.

Cathodic electrodepositable coatings may be prepared from epoxy functional polymers described above by reacting with epoxy resins in the presence of excess amine or polyamine, to completely react all the epoxy groups, distilling off excess amine, and neutralizing the resulting epoxy-amine adduct with water soluble organic or inorganic acids to form water soluble, quarternary ammonium containing polymer salts (see for reference, U.S. Pat. Nos. 3,617,458, 3,619,398, 3,682,814, 3,891,527, 3,947,348, and 4,093,594). Alternatively, the above epoxy-amine polymer adducts may be converted to quarternary phosphonium or sulfonium ion containing polymers, as described in U.S. Pat. No. 3,935,087.

An acrylate-terminated prepolymer curable by free-radical processes can be prepared from the hydrogenated (VIII) polymer by reaction with a diisocyanate (2NCO/OH) followed by further reaction with hydroxyethyl acrylate in the presence of a basic reagent.

Another likely application for acrylate or methacrylate terminated star polymers include use as viscosity index (V.I.) improvers. Using carboxyl functional monomers, such as acrylic acid and methacrylic acid, and/or amine functional monomers such as acrylamide, along with free radical initiators in further polymerizations, can result in the formation of polymer segments at the periphery of each termini with amine or other functionalities which, in addition to the advantageous properties of the polymers as V.I. improvers, combines the ability to add functionality to the polymers for dispersant properties (see, for example, U.S. Pat. Nos. 5,496,898, 4,575,530, 4,486,573, 5,290,874, and 5,290,868).

The versatility of the hydroxyl functional polymers of this invention, and the wide range of different segmented polymers (polyethers, polyesters, polyamides, polycarbonates, polyurethanes, etc.) which can be initiated at the hydroxyl groups, leads to numerous possible applications as compatibilizers for polymer blends and alloys. In addition to the use of such blends for new applications, much recent interest is generated in the use of compatibilizers to facilitate polymer waste recycling.

Alternatively, protecting groups may be removed, either before or after optional hydrogenation of the aliphatic unsaturation, then the hydroxy terminated polymer may be reacted with functional comonomers to produce novel copolymers using these and other processes. Thus, for example, a hydroxy terminated polymer may be hydrogenated, and then reacted with ethylene oxide in the presence of potassium tert-butoxide to produce a poly(ethyleneoxide)-hydrogenated block copolymer. This reaction sequence affords a hydrogel.

Alternatively, the protected monohydroxy terminated polymer (VIII) may be reacted with functional comonomers, without simultaneously removing the protective group. These copolymers then may be deprotected and then further reacted with the same or different comonomers to form yet other novel copolymers. Thus, for example, the hydroxyterminated polymer of formula (VIII) may be hydrogenated, and then reacted with ethylene oxide in the presence of potassium tert-butoxide to produce a poly(ethylene oxide)-hydrogenated polymethyl methacrylate copolymer with one protected hydroxyl group on the polymethyl methacrylate segment. This hydroxyl can then be deprotected and a poly(ethylene oxide) polymer having different chain lengths grown onto both ends of the polymethyl methacrylate segment.

In another possible application, the living polymer (V) may be reacted with an alkenylarylhalosilane, such as styrenyldimethylchlorosilane, to yield the corresponding omega-styrenylterminated macromonomer according to the teachings of U.S. Pat. No. 5,278,244, which may then be further polymerized by a variety of techniques to yield "comb" polymers which, on deprotection and hydrogenation yield branched polymers with hydroxyfunctionality on the branch-ends. Such multi-functionality can be utilized to graft a water-soluble polymer such as poly(ethylene oxide) onto a hydrophobic polyolefinic core to produce hydrogels.

In still another possible application, hydrogenated hydroxyterminated branches of the polymers may be further reacted with acryloyl chloride or methacryloyl chloride, and the resultant acrylate or methacrylate-terminated polymer further polymerized with monomers selected from the group of alkyl acrylates, alkyl methacrylates, and dialkylacrylamides to produce hydrogels. Further, acrylate or methacrylate-terminated polymers may be polymerized by free-radical processes.

The following examples further illustrate the invention.

PREPARATION OF THE INITIATORS

EXAMPLE A

Preparation of 3-(t-Butyldimethylsilyloxy)-1-Propyllithium Chain Extended with 2 Moles of Isoprene A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.20 grams (0.749 mole, 2.80 equivalents) was transferred to the flask with 260 ml cyclohexane. This suspension was stirred at 450 RPMs, and heated to 65° C. with a heating mantle. The heat source was removed. 1-(t-Butyldimethylsilyloxy)-3-chloropropane, 58.82 grams (0.268 mole, 1.00 equivalent) was added dropwise. An exotherm was detected after 31.80 of the feed had been added. A dry ice/hexane cooling bath was applied to maintain the reaction temperature at 60–65° C. The total feed time was one hundred five minutes. An exotherm was noted until the last drop of feed was added, then the temperature fell off rapidly to room temperature. The reaction mixture was stirred at room temperature for forty five minutes, then heated to 65° C. with a heating mantle. The heat source was removed. Isoprene, 36.45 grams (0.535 mole, 2.00 equivalents) was then added dropwise. An exotherm was noted after 24.6% of the feed had been added. Hexane cooling was applied to maintain the reaction temperature at 60–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded an orange solution, yield=530 ml, 425.34 grams. Total base=17.1 wt. %; Active C—Li=15.9 wt %; Yield (based on active C—Li)=80.8%.

EXAMPLE B

Preparation of 3-(t-Butyldimethylsilylthio)-1-propyllithium Chain Extended with 2 Moles of Isoprene A 500 ml, three-necked Morton flask is equipped with a mechanical stirrer, a 125 ml pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.20 grams (0.749 mole, 2.80 equivalents) is transferred to the flask with 260 ml cyclohexane. This suspension is stirred at 450 RPMs, and heated to 65° C. with a heating mantle. The heat source is removed. 1-(t-Butyldimethylsilylthio)-3-chloro-propane, 60.22 grams (0.268 mole, 1.00 equivalent) is added dropwise. An exotherm is detected after 21.8% of the feed has been added. A dry ice/hexane cooling bath is applied to maintain the reaction temperature at 60–65° C. The total feed time is one hundred minutes. An exotherm is noted until the last drop of feed is added, then the temperature falls off rapidly to room temperature. The reaction mixture is stirred at room temperature for forty five minutes, then heated to 65° C. with a heating mantle. The heat source is removed. Isoprene, 36.45 grams (0.535 mole, 2.00 equivalents) is then added dropwise. An exotherm is noted after 24.6% of the feed has been added. Hexane cooling is applied to maintain the reaction temperature at 60–65° C. The total isoprene feed time is thirty eight minutes. The reaction mixture is allowed to stir at room temperature for one hour, then transferred to a small pressure filter with argon pressure. Very rapid filtration is achieved with 2 psi argon. The muds are reslurried with cyclohexane (2×50 ml). This affords an orange solution; yield=530 ml, 435.21 grams. Total base=17.7 wt. %; Active C—Li=16.9 wt %; Yield (based on active C—Li)=82.4%.

EXAMPLE C

Preparation of 3-(N,N-Dimethylamino)-1-propyllithium Chain Extended with 2 Moles of Isoprene A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 10.57 grams (1.520 moles) was transferred to the flask with 250 ml cyclohexane. Coarse sand, 45.3 grams, was added to the reaction mixture. This suspension was stirred at 600–675 RPMs, and heated to 37° C. with a heating mantle. The heat source was removed. 1-Chloro-3-(N,N-dimethylamino)propane, 19.64 grams (0.1615 mole) dissolved in 120 ml. Cyclohexane was added dropwise. An exotherm (up to 52° C.) was detected after 7% of the feed had been added. A dry ice/hexane cooling bath was applied to maintain the reaction temperature at 41–44° C. The total feed time was thirty-two minutes. An exotherm was noted until the last drop of feed was added, then the temperature was maintained at 36–40° C. for an additional thirty minutes. The reaction mixture was then transferred to a sintered glass filter while still warm. The filtration was complete in three minutes with three psi argon pressure. This afforded a hazy suspension. Yield=400 ml, 298.2 grams. Active C—Li=0.361M (0.469 m/kg) at 40° C. Yield (based on active C—Li=87%.

The product crystallized from solution upon standing at room temperature. The concentration of the clear supernatant solution was about 0.3M.

A dry 500 ml round bottom flask was fitted with a magnetic stir bar, and an argon inlet. This apparatus was purged with argon, then 154.77 grams (0.0726 mole) of the suspension prepared above was added to the flask. Isoprene, 9.4 grams (0.138 mole, 1.90 equivalents) was then added all at once. The reaction mixture was then heated to 48–49° C. for forty minutes. This afforded a slightly hazy golden solution, which was partially vacuum-stripped on the rotary evaporator to afford the product solution. Yield=43.32 grams. Active C—Li=1.36M (1.65 m/kg). Recovered yield (based on active C—Li)=98.5%.

EXAMPLES OF THE INVENTION PREPARATION OF POLYMERS

Example 1

Synthesis of t-Butoxy Functionalized Poly(methyl methacrylate) (PMMA)

A glass reactor was equipped with four break-seal reagent ampoules, a sampling port attached with a Teflon stopcock, an inlet tube fitted a septum cap, and a magnetic stir bar. This reactor was flame sealed to a high vacuum line, and evacuated at 120° C. for 8 hours. A solution of the initiator, 3-(1,1-dimethylethoxy)-1-propyllithium chain extended with 2 moles of isoprene in toluene ($3.51 \times 10^{-4}$ moles) was added to the reactor with a syringe via the inlet tube. The inlet tube was then flame sealed, and the reactor was re-evacuated. The solvent was removed from the initiator. The reactor was then cooled to −78° C., and tetrahydrofuran (50 ml.) was added from a break seal ampoule.

1,1-Diphenylethylene ($4.21 \times 10^{-4}$ moles) (1.2 equivalents), was then added from another break seal ampoule. Immediately, the dark red color, characteristic of the highly delocalized diphenyl alkyl anion, appeared. The crossover reaction, monitored by UV/Vis spectroscopy, was complete in 30 minutes. Freshly distilled methyl methacrylate (20 wt. % in tetrahydrofuran) was then added with rapid stirring from another break seal ampoule. The reaction was allowed to proceed for 10 minutes at −78° C., then quenched with a mixture of HCl/methanol added from the last break seal ampoule. The polymer was recovered by precipitation into methanol, and vacuum dried.

The resultant polymer was characterized by $^1$H NMR and SEC analyses, and had the following properties: $M_n$=9.3×10$^3$ g/mole; $M_w$=10.2×10$^3$ g/mole; MWD=1.09

Example 2

Deprotection of tert-Butoxy Group from Poly (methyl methacrylate) (PMMA) with Trimethylsilyl Iodide A 100 ml, three necked flask is fitted with a magnetic stir bar, a nitrogen inlet, and a septum. This apparatus is dried in an oven overnight at 125° C., assembled hot, and allowed to cool in a stream of nitrogen. Tert-butoxy-PMMA polymer, prepared in Example 1, (0.5 g) and chloroform (25 ml, distilled) are added to the flask. Trimethylsilyl iodide (0.45 ml, three-fold molar excess relative to tert-butoxy protecting groups) is added via syringe. The reaction is stirred at room temperature, and is monitored by TLC analysis for the disappearance of the starting material. When all the starting material has been consumed by TLC analysis, the reaction mixture is extracted with aqueous sodium bicarbonate solution three times to remove excess tert-butyl iodide and trimethylsilyl iodide. The polymer is precipitated in methanol and then washed with excess methanol. The solvent is evaporated under reduced pressure to give hydroxy-terminated polymethylmethacrylate polymer.

Complete deprotection is determined by $^1$H NMR analysis (loss of tert-butoxy signal).

Example 3

Synthesis of Telechelic t-Butoxy Functionalized Poly(methyl methacrylate) (PMMA)

A glass reactor is equipped with four break-seal reagent ampoules, a sampling port attached with a Teflon stopcock, an inlet tube fitted a septum cap, and a magnetic stir bar. This reactor is flame sealed to a high vacuum line, and evacuated at 120° C. for 8 hours. A solution of the initiator, 3-(1,1-dimethylethoxy)-1-propyllithium chain extended with 2 moles of isoprene in toluene (3.51×10$^{-4}$ moles) is added to the reactor with a syringe via the inlet tube. The inlet tube is then flame sealed, and the reactor is re-evacuated. The solvent is removed from the initiator. The reactor is then cooled to −78° C., and tetrahydrofuran (50 ml) is added from a break seal ampoule.

1,1-Diphenylethylene (4.21×10$^{-4}$ moles) (1.2 equivalents) is then added from another break seal ampoule. Immediately, the dark red color, characteristic of the highly delocalized diphenyl alkyl anion, appears. The crossover reaction, monitored by UV/Vis spectroscopy, is complete in 30 minutes. Freshly distilled methyl methacrylate in (20 wt. % in tetrahydrofuran) is then added with rapid stirring from another break seal ampoule. The reaction is allowed to proceed for 10 minutes at −78° C., then excess ethylene oxide (1.4×10$^{-3}$) (4 equivalents) is added through the stopcock. When this reaction is complete, the reaction is quenched with a mixture of HCl/methanol added from the last break seal ampoule. The polymer is recovered by precipitation into methanol, and vacuum dried.

The resultant polymer is characterized by $^1$H NMR and SEC analyses, and has the following properties: $M_n$=9.3×10$^3$ g/mole; $M_w$=10.2×10$^3$ g/mole; MWD=1.09

Example 4

Deprotection of Telechelic tert-Butoxy Group from Poly(methyl methacrylate) (PMMA) with Trimethylsilyl iodide A 100 ml, three necked flask is fitted with a magnetic stir bar, a nitrogen inlet, and a septum. This apparatus is dried in an oven overnight at 125° C., assembled hot, and allowed to cool in a stream of nitrogen. Tert-butoxy-PMMA polymer, prepared in Example 3, (0.5 g) is placed and chloroform (25 ml, distilled) are added to the flask. Trimethylsilyl iodide (0.45 ml, three-fold molar excess relative to tert-butoxy protecting groups) is added via syringe. The reaction is stirred at room temperature, and is monitored by TLC analysis for the disappearance of the starting material. When all the starting material has been consumed by TLC analysis, the reaction mixture is extracted with aqueous sodium bicarbonate solution three times to remove excess tert-butyl iodide and trimethylsilyl iodide. The polymer is precipitated in methanol and then washed with excess methanol. The solvent is evaporated under reduced pressure to give telechelic hydroxy-terminated polymethylmethacrylate polymer. Complete deprotection is determined by $^1$H NMR analysis (loss of tert-butoxy signal).

Example 5

Synthesis of t-Butoxy Functionalized Poly(methyl methacrylate) (PEA) Star

A glass reactor was equipped with four break-seal reagent ampoules, a sampling port attached with a Teflon stopcock, an inlet tube fitted a septum cap, and a magnetic stir bar. This reactor was charged with lithium chloride, 0.03 grams ([LiCl]:[Li$^+$]=2:1) and the flame sealed to a high vacuum line, and evacuated at 120° C. for 8 hours. A solution of the initiator, 3-(1,1-dimethylethoxy)-1-propyllithium chain extended with 2 moles of isoprene in toluene (3.51×10$^{-4}$ moles) was added to the reactor with a syringe via the inlet tube. The inlet tube was then flame sealed, and the reactor was re-evacuated. The solvent was removed from the initiator. Tetrahydrofuran (50 ml) was distilled into the reactor. The reactor was then flame sealed from the vacuum line. The reactor was cooled to 0° C., then 1,1-diphenylethylene (4.21×10$^{-4}$ moles) (1.2 equivalents) diluted with 0.2 ml. of cyclohexane, was added from a break seal ampoule. Immediately, the dark red color, characteristic of the highly delocalized diphenyl alkyl anion, appeared. The crossover reaction, monitored by UV/.Vis spectroscopy, was complete in 30 minutes. The reaction mixture was then cooled to −78° C. Freshly distilled, precooled methyl methacrylate 20 (wt. % in tetrahydrofuran), was then added with rapid stirring from another break seal ampoule. The reaction was allowed to proceed for eight minutes at −78° C. then an aliquot was withdrawn through the precooled sample port, and quenched with acidic methanol. The resultant polymer was analyzed by SEC and NMR. Immediately after the sample was withdrawn, precooled ethylene glycol dimethacrylate (8.42×10$^{-4}$ moles) (2.4 equivalents) was added over five minutes. The reaction mixture was stirred for thirty minutes, then quenched with a mixture of HCl/methanol added from the last break seal ampoule. The polymer was recovered by precipitation into methanol, and vacuum dried.

The resultant base polymer was characterized by $^1$H NMR and SEC, and had the following properties: $M_n$=8.7×10$^3$ g/mole; MWD=1.05.

The resultant star polymer was characterized by $^1$H NMR and SEC, and had the following properties: $M_n$=3.17×10$^4$ g/mole (based on linear PMMA standards); MWD=1.36; % Unlinked=17%

Example 6

Synthesis of t-Butoxy Functionalized Poly(methyl methacrylate) (PMMA) Star

A glass reactor was equipped with four break-seal reagent ampoules, a sampling port attached with a Teflon stopcock, an inlet tube fitted a septum cap, and a magnetic stir bar. This reactor was charged with lithium chloride, 0.03 grams, ([LiCl]:[Li$^+$]=2:1) and then flame sealed to a high vacuum line, and evacuated at 120° C. for 8 hours. A solution of the initiator, 3-(1,1-dimethylethoxy)-1-propyllithium chain extended with 2 moles of isoprene in toluene ($3.51 \times 10^{-4}$ moles) was added to the reactor with a syringe via the inlet tube. The inlet tube was then flame sealed, and the reactor was re-evacuated. The solvent was removed from the initiator. Tetrahydrofuran (50 ml) was distilled into the reactor. The reactor was then flame sealed from the vacuum line. The reactor as cooled to 0° C., then 1,1-diphenylethylene ($4.21 \times 10^{-4}$ moles) (1.2 equivalents) diluted with 0.2 ml of cyclohexane, was added from a break seal ampoule. Immediately, the dark red color, characteristic of the highly delocalized diphenyl alkyl anion, appeared. The crossover reaction, monitored by UV/Vis spectroscopy, was complete in 30 minutes. The reaction mixture was then cooled to –78° C. Then an aliquot was withdrawn through the precooled sample port, and quenched with acidic methanol. The resultant polymer was analyzed by SEC and NMR. Immediately after the sample was withdrawn, precooled ethylene glycol dimethacrylate ($1.053 \times 10^{-3}$ moles) (3.0 equivalents) was added over five minutes. The reaction mixture was stirred for thirty minutes, then quenched with a mixture of HCl/methanol added from the last break seal ampoule. The polymer was recovered by precipitation into methanol, and vacuum dried.

The resultant base polymer was characterized by $^1$H NMR and SEC analyses, and had the following properties: $M_n = 7.2 \times 10^3$ g/mole; MWD=1.07.

The resultant star polymer was characterized by $^1$H NMR and SEC analyses, and had the following properties: $M_n = 7.24 \times 10^4$ g/mole (based on linear PMMA standards); MWD=1.17; % Unlinked=14%.

Example 7

Deprotection of tert-Butoxy Group from Poly (methyl methacrylate) (PMMA) Star with Trimethylsilyl Iodide A 100 ml, three necked flask was fitted with a magnetic stir bar, a nitrogen inlet, and a septum. This apparatus was dried in an oven overnight at 125° C., assembled hot, and allowed to cool in a stream of nitrogen. Tert-butoxy-PMMA star polymer, prepared in Example 5, (0.5 g) and chloroform (25 ml, distilled) were added to the flask. Trimethylsilyl iodide (0.45 ml, three-fold molar excess relative to tert-butoxy protecting groups) was added via syringe. The reaction was stirred at room temperature, and was monitored by TLC analysis for the disappearance of the starting material. When all the starting material had been consumed by TLC analysis, the reaction mixture was extracted with aqueous sodium bicarbonate solution three times to remove excess tert-butyl iodide and trimethylsilyl iodide. The polymer was precipitated in methanol and then washed with excess methanol. The solvent was evaporated under reduced pressure to give hydroxy-terminated polymethylmethacrylate star polymer.

Complete deprotection was determined by $^1$H NMR analysis (loss of tert-butoxy signal).

Example 8

Deprotection of tert-Butoxy Group from Poly (methyl methacrylate) (PMMA) Star with Amberlyst Resin A 50 ml, round bottom flask was fitted with a magnetic stir bar, a reflux condenser, and a nitrogen inlet. This apparatus was dried overnight at 125° C., assembled hot, and allowed to cool in a stream of nitrogen. Tert-butoxy-PMMA star polymer, prepared in Example 5, 0.3 g) and t-butylbenzene (10 ml) were added to the flask. Ground Amberlyst A-15 resin, 0.3 grams, was added to the flask. The reaction flask was placed in a thermostated oil bath at 170° C. The solution was stirred at this temperature for one hour, then allowed to cool to room temperature. The resin was removed by filtration through a fritted glass filter. The filter cake was washed with tetrahydrofuran. The solvent was removed on a rotary evaporator, then dried on the vacuum line. This afforded the hydroxy-terminated poly(methyl methacrylate) star polymer.

Complete deprotection was determined by $^1$H NMR analysis (loss of tert-butoxy signal).

Example 9

Synthesis of t-Butyldimethylsilyloxy Functionalized Poly(methyl methacrylate) (PMMA) Star A glass reactor was equipped with four break-seal reagent ampoules, a sampling port attached with a Teflon stopcock, an inlet tube fitted a septum cap, and a magnetic stir bar. This reactor was charged with lithium chloride, 0.03 grams, ([LiCl]:[Li$^+$]=2:1) and then flame sealed to a high vacuum line, and evacuated at 120° C. for 8 hours. A solution of the initiator, 3-(t-butyldimethylsilyloxy)-1-propyllithium in cyclohexane ($3.51 \times 10^{-4}$ moles) was added to the reactor with a syringe via the inlet tube. The inlet tube was then flame sealed, and the reactor was re-evacuated. The solvent was removed from the initiator. Tetrahydrofuran (50 ml.) was distilled into the reactor. The reactor was then flame sealed from the vacuum line. The reactor was cooled to 0° C., then 1,1-diphenylethylene ($4.21 \times 10^{-4}$ moles) (1.2 equivalents) diluted with 0.2 ml. of cyclohexane, was added from a break seal ampoule. Immediately, the dark red color, characteristic of the highly delocalized diphenyl alkyl anion, appeared. The crossover reaction, monitored by Uv/Vis spectroscopy, was complete in 30 minutes. The reaction mixture was then cooled to –78° C. Freshly distilled, precooled methyl methacrylate (20 wt. % in tetrahydrofuran), was then added with rapid stirring from another break seal ampoule. The reaction was allowed to proceed for eight minutes at –78° C. Then an aliquot was withdrawn through the precooled sample port, and quenched with acidic methanol. The resultant polymer was analyzed by SEC and NMR. Immediately after the sample was withdrawn, precooled ethylene glycol dimethacrylate ($1.053 \times 10^{-3}$ moles) (3.0 equivalents) was added over five minutes. The reaction mixture was stirred for thirty minutes, then quenched with a mixture of HCl/methanol added from the last break seal ampoule. The polymer was recovered by precipitation into methanol, and vacuum dried.

The resultant base polymer was characterized by $^1$H NMR and SEC, and had the following properties: $M_n = 7.8 \times 10^3$ g/mole; MWD=1.09.

The resultant star polymer was characterized by $^1$H NMR and SEC, and had the following properties: $M_n = 5.21 \times 10^4$ g/mole (based on linear PMMA standards); MWD=1.16; % Unlinked=37%.

Example 10

Deprotection of tert-Butyldimethylsilyloxy Group from Poly(methyl methacrylate) (PMMA) Star with Fluoride A 100 ml, three necked flask is fitted with a magnetic stir bar, a nitrogen inlet, and a septum. This apparatus is dried in an oven overnight at 125° C., assembled hot, and allowed to cool in a stream of nitrogen. Tert-butyldimethysilyloxy-PMMA star polymer, prepared in Example 9, (0.5 g) and tetrahydrofuran (25 ml, distilled) are added to the flask. Excess tetrabutylammonium fluoride, 1.0 molar in tetrahydrofuran (1.0 ml) is added via syringe. the reaction is stirred at room temperature, and is monitored by TLC analysis for the disappearance of the starting material. When all the starting material has been consumed by TLC analysis, the reaction mixture is extracted with water (3×25 ml.). The organic solvent is removed on the rotary evaporator. The deprotected hydroxy-terminated poly(methyl methacrylate) star polymer is isolated by precipitation in methanol, washed with methanol, and vacuum dried.

Complete deprotection is determined by $^1$H NMR analysis (loss of tert-butyldimethylsilyl signal).

Example 11

Synthesis of Dimethylamino Functionalized Poly (methyl methacrylate) (PMMA) Star A glass reactor is equipped with four break-seal reagent ampoules, a sampling port attached with a Teflon stopcock, an inlet tube fitted a septum cap, and a magnetic stir bar. This reactor is charged with lithium chloride, 0.03 grams, ([LiCl]:[Li$^+$]=2:1) and then flame sealed to a high vacuum line, and evacuated at 120° C. for 8 hours. A solution of the initiator, 3-(dimethylamino)-1-propyllithium chain extended with two moles of isoprene in cyclohexane ($3.51 \times 10^{-4}$ moles) is added to the reactor with a syringe via the inlet tube. The inlet tube is then flame seared, and the reactor is re-evacuated. The solvent is removed from the initiator. Tetrahydrofuran (50 ml) is distilled into the reactor. The reactor is then flame sealed from the vacuum line. The reactor is cooled to 0° C., then 1,1-diphenylethylene ($4.21 \times 10^{-4}$ moles) (1.2 equivalents) diluted with 0.2 ml. of cyclohexane, is added from a break seal ampoule. Immediately, the dark red color, characteristic of the highly delocalized diphenyl alkyl anion, appears. The crossover reaction, monitored by UV/Vis spectroscopy, is complete in 30 minutes. The reaction mixture is then cooled to −78° C. Freshly distilled, precooled methyl methacrylate (20 wt. % in tetrahydrofuran), is then added with rapid stirring from another break seal ampoule. The reaction is allowed to proceed for eight minutes at −78° C. Then an aliquot is withdrawn through the precooled sample port, and quenched with acidic methanol. The resultant polymer is analyzed by SEC and NMR. Immediately after the sample is withdrawn, precooled ethylene glycol dimethacrylate ($1.053 \times 10^{-3}$ moles) (3.0 equivalents) is added over five minutes. The reaction mixture is stirred for thirty minutes, then quenched with a mixture of HCl/methanol added from the last break seal ampoule. The polymer is recovered by precipitation into methanol, and vacuum dried.

The resultant base polymer is characterized by $^1$H NMR and SEC analyses, and has the following properties: $M_n = 7.8 \times 10^3$ g/mole; MWD=1.09.

The resultant star polymer is characterized by $^1$H NMR and SEC analyses, and has the following properties: $M_n = 5.21 \times 10^4$ g/mole (based on linear PMMA standards); MWD=1.15; % Unlinked=16%.

The foregoing examples are illustrative of the present invention and are not to be construed as limiting thereof. The invention is defined by the following claims, with equivalents of the claims to be included therein.

That which is claimed is:

1. A process for preparing a multi-branched or star-shaped polymer, comprising:

polymerizing a monomer selected from the group consisting of esters, amides, and nitrites of acrylic and methacrylic acid, and mixtures thereof, with a protected functional organometallic initiator of the formula

$$M\text{—}R_n\text{—}Z\text{—}J\text{—}[A(R^1R^2R^3)]_x \quad \text{(III)}$$

wherein:

M is an alkali metal;

R is a saturated or unsaturated hydrocarbyl group derived by incorporation of a compound selected from the group consisting of conjugated diene hydrocarbons, alkenylsubstituted aromatic hydrocarbons, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, or nitrogen;

$[A(R^1R^2R^3)]_x$ is a protecting group, in which A is an element selected from Group IVa of the Periodic Table of Elements;

$R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen, to form a mono-protected, mono-functionalized living polymer; and coupling said living polymer with at least one other living polymer with a linking agent.

2. The process of claim 1, wherein said linking agent is selected from the group consisting of reactive halogen compounds and multifunctional acrylates.

3. The process of claim 2, wherein said linking agent is selected from the group consisting of α,α'-dibromo-p-xylene, α,α',α"-tribromo-mesitylene, ethylene glycol dimethylacrylate and glycerol trimethacrylate.

4. The process of claim 1, wherein said polar monomer is methyl methacrylate.

5. The process of claim 1, wherein A is carbon or silicon.

6. The process of claim 1, further comprising saturating at least a portion of aliphatic unsaturation of said polymer with hydrogen after said polymerizing step.

7. The process of claim 6, wherein said saturating step comprises saturating at least about 90% of the aliphatic unsaturation with hydrogen.

8. The process of claim 6, wherein said saturating step comprises saturating at least a portion of aliphatic unsaturation of said polymer with hydrogen prior to deprotecting said polymer.

9. The process of claim 6, further comprising deprotecting said polymer prior to said saturating step.

10. The process of claim 1, further comprising deprotecting said polymer after said polymerizing step.

11. The process of claim 1, wherein said organometallic initiator is selected from the group consisting of omega-(tert-alkoxy)-1-alkyllithiums, omega-(tert-alkoxy)-1-alkyllithiums chain extended with conjugated alkadienes, alkenylsubstituted aromatic hydrocarbons, and mixtures thereof, omega-(tert-alkylthio)-1-alkyllithiums, omega-(tert-alkylthio)-1-alkyllithiums chain extended with conjugated alkadienes, alkenylsubstituted aromatic hydrocarbons, and mixtures thereof, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with conjugated alkadienes, alkenylsubstituted aromatic hydrocarbons, and mixtures thereof, and omega-(bis-tert-alkylsilylamino)-1-alkyllithiums.

12. The process of claim 11, wherein said organometallic initiator is selected from the group consisting of 3-(1,1-dimethylethoxy)-1-propyllithium, 3-(tert-butyldimethylsilyloxy)-1-propyllithium, 3-(1,1-dimethylethylthio)-1-propyllithium, 3-(dimethylamino)-1-propyllithium, 3-(di-tert-butyldimethylsilylamino)-1-propyllithium, 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 3-[3-(dimethylamino)-1-propyloxy]-1-propyllithium, 3-[2-(dimethylamino)-1-ethoxy]-1-propyllithium, 3-[2-(diethylamino)-1-ethoxy]-1-propyllithium, 3-[2-(diisopropyl)amino]-1-ethoxy]-1-propyllithium, 3-[2-(1-piperidino)-1-ethoxy]-1-propyllithium, 3-[2-(1-pyrrolidino)-1-ethoxy]-1-propyllithium, 4-[3-(dimethylamino)-1-propyloxy]-1-butyllithium, 6-[2-(1-piperidino)-1-ethoxy]-1-hexyllithium, 3-[2-(methoxy)-1-ethoxy]-1-propyllithium, 3-[2-(ethoxy)-1-ethoxy]-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium, chain extended oligomeric analogs thereof chain extended with a hydrocarbyl group derived by incorporation of a compound selected from the group consisting of alkadienes, alkenyl substituted aromatic hydrocarbons, and mixtures thereof and mixtures thereof.

13. The process of claim 1, wherein said polar monomer is reacted singly, sequentially, or as a mixture thereof with one another and/or with other polar comonomers.

14. The process of claim 1, further comprising copolymerizing said polymer with at least one comonomer.

15. The process of claim 14, wherein said comonomer is selected from the group consisting of lactams, cyclic ethers, diamines, diisocyanates, polyisocyanates, diamides, polyamides, cyclic amides, dicarboxylic acids, polycarboxylic acids, diols, polyols, anhydrides, and mixtures thereof.

16. The process of claim 1, wherein said polymerizing step comprises polymerizing a monomer selected from the group consisting of esters, amides, and nitriles of acrylic and methacrylic acid, and mixtures thereof, with at least one protected functional organometallic initiator of Formula (III) and at least one non-functional organometallic initiator to provide a multi-branched or star-shaped polymer having at least one functional end and at least one non-functional end.

17. The process of claim 1, wherein said polymerizing step comprises polymerizing a monomer selected from the group consisting of esters, amides, and nitriles of acrylic and methacrylic acid, and mixtures thereof, with at least two protected functional organometallic initiators of Formula (III) in which J is different to provide a multi-branched or star-shaped polymer having at least two different functional ends.

18. The process of claim 1, wherein said polymerizing step comprises polymerizing a polar monomer selected from group consisting of esters, amides, and nitrites of acrylic and methacrylic acid, and mixtures thereof, with protected functional organometallic initiators of Formula (III) in which $[A(R^1R^2R^3)]_x$ is different to provide a multi-branched or star-shaped polymer having at least two functional ends having different protecting groups.

19. A process for preparing polar polymers, comprising:

polymerizing a polar monomer selected from the group consisting of esters, amides, and nitrites of acrylic and methacrylic acid, and mixtures thereof, with a protected functional organometallic initiator of the formula

$$M—R_n—Z—J—[A(R^1R^2R^3)]_x \qquad (III)$$

wherein:

M is an alkali metal;

R is a saturated or unsaturated hydrocarbyl group derived by incorporation of a compound selected from the group consisting of conjugated diene hydrocarbons, alkenylsubstituted aromatic hydrocarbons, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, or nitrogen;

$[A(R^1R^2R^3)]_x$ is a protecting group in which:

A is an element selected from Group IVa of the Periodic Table of Elements;

$R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen, to form a mono-protected, mono-functionalized living polymer;

removing the protecting group $[A(R^1R^2R^3)]_x$; and copolymerizing J with at least one comonomer selected from the group consisting of lactams, cyclic ethers, diamines, diisocyanates, polyisocyanates, diamides, polyamides, cyclic amides, dicarboxylic acids, polycarboxylic acids, diols, polyols, anhydrides, and mixtures thereof.

* * * * *

UNITED STATES PATENT AND TRADEMARK OFFICE
CERTIFICATE OF CORRECTION

PATENT NO. : 5,900,464
DATED : May 4, 1999
INVENTOR(S) : Letchford et al.

It is certified that error appears in the above-identified patent and that said Letters Patent is hereby corrected as shown below:

Title page, item [56], in the References Cited, OTHER PUBLICATIONS, line 10, "169" should read --1691--.

Column 28, line 16, "nitrites" should read --nitriles--.

Column 30, line 58 and 66, "nitrites", each occurrence, should read --nitriles--.

Column 31, lines 7 and 15, "nitrites", each occurrence, should read --nitriles--.

Signed and Sealed this

Fourteenth Day of September, 1999

Q. TODD DICKINSON

*Attest:*

*Attesting Officer*  *Acting Commissioner of Patents and Trademarks*